United States Patent
Miller

(10) Patent No.: US 10,539,034 B2
(45) Date of Patent: Jan. 21, 2020

(54) RADIAL SEAL WITH OFFSET RELIEF CUT

(71) Applicant: United Technologies Corporation, Farmington, CT (US)

(72) Inventor: Jonathan Logan Miller, Ware, MA (US)

(73) Assignee: United Technologies Corporation, Farmington, CT (US)

( * ) Notice: Subject to any disclaimer, the term of this patent is extended or adjusted under 35 U.S.C. 154(b) by 349 days.

(21) Appl. No.: 15/028,729

(22) PCT Filed: Oct. 17, 2014

(86) PCT No.: PCT/US2014/061057
§ 371 (c)(1),
(2) Date: Apr. 12, 2016

(87) PCT Pub. No.: WO2015/065731
PCT Pub. Date: May 7, 2015

(65) Prior Publication Data
US 2016/0273375 A1 Sep. 22, 2016

Related U.S. Application Data

(60) Provisional application No. 61/896,178, filed on Oct. 28, 2013.

(51) Int. Cl.
*F01D 11/00* (2006.01)
*F16J 15/44* (2006.01)
(Continued)

(52) U.S. Cl.
CPC ........... *F01D 11/003* (2013.01); *F16J 15/441* (2013.01); *F16J 15/442* (2013.01); *F01D 11/025* (2013.01);
(Continued)

(58) Field of Classification Search
CPC ..... F01D 11/003; F01D 11/025; F16J 15/441; F16J 15/442; F02C 7/28
See application file for complete search history.

(56) References Cited

U.S. PATENT DOCUMENTS 3,575,424 A * 4/1971 Taschenberg .......... F16J 15/441
277/411
3,743,303 A * 7/1973 Pope ....................... F01D 11/00
277/422
(Continued)

FOREIGN PATENT DOCUMENTS

EP 0992723 A2 4/2000

OTHER PUBLICATIONS

European Search Report for EP Application No. 14858952.6 dated Jun. 8, 2017.
(Continued)

*Primary Examiner* — Nicholas L Foster
(74) *Attorney, Agent, or Firm* — Carlson, Gaskey & Olds, P.C.

(57) ABSTRACT

A seal assembly for a turbine engine is disclosed and includes a fixed housing including an axial surface defining an inner diameter and an annular seal that is disposed within the housing and seal against a radial surface of the fixed housing. The annular seal includes a first surface transverse to an axis of rotation and a second surface parallel to the axis of rotation defining an inner periphery. The first surface includes a first notch spaced apart from the inner periphery and overlapping the inner diameter of the fixed housing.

18 Claims, 4 Drawing Sheets

(51) Int. Cl.
*F02C 7/28* (2006.01)
*F01D 11/02* (2006.01)

(52) U.S. Cl.
CPC ............ *F02C 7/28* (2013.01); *F05D 2220/32* (2013.01); *F05D 2240/55* (2013.01)

(56) References Cited

U.S. PATENT DOCUMENTS

| | | | | |
|---|---|---|---|---|
| 3,743,304 A * | 7/1973 | Lindeboom | ............ | F16J 15/441 277/422 |
| 3,756,673 A * | 9/1973 | Strub | ............ | F16C 17/03 384/117 |
| 3,804,424 A * | 4/1974 | Gardner | ............ | F16J 15/3412 277/360 |
| 4,082,296 A * | 4/1978 | Stein | ............ | F16J 15/3412 277/400 |
| 4,145,058 A | 3/1979 | Hady et al. | | |
| 4,211,424 A * | 7/1980 | Stein | ............ | F01D 11/003 277/352 |
| 5,014,999 A | 5/1991 | Makhobey | | |
| 5,039,115 A * | 8/1991 | Hebert | ............ | F01D 11/00 277/347 |
| 5,174,584 A | 12/1992 | Lahrman | | |
| 5,284,347 A | 2/1994 | Pope | | |
| 5,375,853 A | 12/1994 | Wasser et al. | | |
| 5,509,664 A * | 4/1996 | Borkiewicz | ............ | F16J 15/442 277/543 |
| 5,516,118 A * | 5/1996 | Jones | ............ | F16J 15/3488 277/400 |
| 5,558,341 A | 9/1996 | McNickle et al. | | |
| 6,132,168 A | 10/2000 | Kovaleski et al. | | |
| 6,145,843 A * | 11/2000 | Hwang | ............ | F16J 15/442 277/400 |
| 6,338,490 B1 | 1/2002 | Bainachi | | |
| 6,431,550 B1 * | 8/2002 | Tong | ............ | F16J 15/442 277/346 |
| 7,159,873 B2 | 1/2007 | McCutchan | | |
| 7,291,947 B2 * | 11/2007 | Hashiba | ............ | F16J 15/26 277/408 |
| 7,931,277 B2 * | 4/2011 | Garrison | ............ | F01D 25/183 277/399 |
| 7,963,525 B1 * | 6/2011 | Garrison | ............ | F01D 25/183 277/399 |
| 8,091,898 B2 * | 1/2012 | Garrison | ............ | F01D 25/183 277/399 |
| 8,286,969 B2 * | 10/2012 | Chochua | ............ | F01D 11/003 277/418 |
| 8,387,991 B2 | 3/2013 | Durling | | |
| 8,430,628 B2 | 4/2013 | Turnquist et al. | | |
| 8,905,408 B2 * | 12/2014 | Garrison | ............ | F01D 11/02 277/348 |
| 9,353,639 B2 * | 5/2016 | Garrison | ............ | F01D 11/02 |
| 9,695,940 B2 * | 7/2017 | Haynes | ............ | F16J 15/34 |
| 2002/0117807 A1 | 8/2002 | Yoshida et al. | | |
| 2005/0206249 A1 * | 9/2005 | Hashiba | ............ | F16J 15/26 310/54 |
| 2007/0096398 A1 | 5/2007 | Miller et al. | | |
| 2009/0224484 A1 * | 9/2009 | Chochua | ............ | F01D 11/003 277/411 |
| 2013/0241153 A1 * | 9/2013 | Garrison | ............ | F01D 11/02 277/350 |
| 2015/0069712 A1 * | 3/2015 | Garrison | ............ | F01D 11/02 277/303 |
| 2015/0167846 A1 * | 6/2015 | Haynes | ............ | F16J 15/442 277/350 |
| 2016/0010483 A1 * | 1/2016 | Miller | ............ | F01D 11/003 277/543 |
| 2016/0130963 A1 * | 5/2016 | Wilson | ............ | F01D 11/001 60/805 |
| 2016/0201804 A1 * | 7/2016 | Fitzmorris | ............ | F16J 15/3452 277/361 |
| 2017/0261107 A1 * | 9/2017 | Martin | ............ | F16J 15/3452 |

OTHER PUBLICATIONS

International Preliminary Report on Patentability for International Application No. PCT/US2014/061057 dated May 12, 2016.
International Search Report and Written Opinion for International Application No. PCT/US2014/061057 dated Jan. 26, 2015.

\* cited by examiner

RADIAL SEAL WITH OFFSET RELIEF CUT

CROSS REFERENCE TO RELATED APPLICATION

This application claims priority to U.S. Provisional Application No. 61/896,178 filed on Oct. 28, 2013.

BACKGROUND

A turbine engine typically includes a compressor section, a combustor section and a turbine section. The compressor section is driven by the turbine section through a shaft. Air entering the compressor section is compressed and delivered into the combustion section where it is mixed with fuel and ignited to generate a high-energy exhaust gas flow. Seals are provided between static components and the rotating components to separate regions of high and low pressure gas, liquid or temperatures.

A seal assembly includes a fixed part that supports an annular seal that interfaces with the rotating component. The seal component can be supported within a fixed housing or static portion of the engine proximate a rotating shaft or rotor. The annular seal seals radially against the rotating shaft or rotor component and axially against the fixed housing. A radial gap between the fixed housing and the rotating shaft does not experience wear like other portions of the annular seal. Uneven wear on a sealing face of the annular seal can result in premature degradation and may influence overall engine performance.

A relief cut within the radial gap reduces the uneven wear, but can result in a degradation of seal performance. Moreover, the performance of the seal can be detrimentally influenced by uneven pressures along the sealing surfaces.

Engine manufacturers continually seek improvements in engine performance, thermal efficiency as well as durability and maintenance efficiencies.

SUMMARY

A seal assembly according to an exemplary embodiment of this disclosure, among other possible things includes a fixed housing including an inner fixed surface, and an annular seal disposed within the fixed housing. The annular seal includes a first surface transverse to an axis of rotation and a second surface parallel to the axis of rotation defining an inner periphery. The first surface includes a first notch spaced apart from the second surface and overlapping the inner fixed surface of the fixed housing.

In a further embodiment of any of the foregoing seal assemblies, the first notch includes a radially inner axial surface spaced apart from a radially outer axial surface.

In a further embodiment of any of the foregoing seal assemblies, the first surface transverse to an axis of rotation includes an upper radial surface radially outboard of the first notch and a lower radial surface flush with the upper radial surface radially inboard of the first notch.

In a further embodiment of any of the foregoing seal assemblies, the first notch extends annularly about the annular seal.

In a further embodiment of any of the foregoing seal assemblies, includes a second notch on the first surface spaced radially outward from the first notch.

In a further embodiment of any of the foregoing seal assemblies, includes at least one slot in communication with the second notch and a radially outer surface of the annular seal.

In a further embodiment of any of the foregoing seal assemblies, the annular seal includes a third notch disposed on the second surface and spaced axially aft of the first surface.

In a further embodiment of any of the foregoing seal assemblies, includes a radial spring disposed on a radially outer surface of the annular seal for biasing the annular seal into contact with a rotating element.

In a further embodiment of any of the foregoing seal assemblies, the annular seal includes a first annular seal and a second annular seal disposed within the fixed housing and a biasing member biasing the first annular seal away from the second annular seal and into engagement with the fixed housing.

A seal assembly for a turbine engine according to an exemplary embodiment of this disclosure, among other possible things includes a fixed housing including a radially inner fixed surface. A rotating element is configured for rotation about an axis. The radially inner fixed surface of the fixed housing is spaced apart from the rotating element. An annular seal is disposed within the fixed housing including a first surface configured for sealing against the fixed housing. A second surface is configured for sealing against the rotating element and a first notch on the first surface spaced radially apart from the second surface. The radially inner fixed surface of the fixed housing is aligned with the first notch.

In a further embodiment of any of the foregoing seal assemblies, the first notch includes a radially inner axial surface and a radially outer axial surface.

In a further embodiment of any of the foregoing seal assemblies, the first surface is disposed transverse to the axis and includes an upper radial surface radially outward of the first notch and a lower radial surface axially flush with the upper radial surface and radially inward of the first notch.

In a further embodiment of any of the foregoing seal assemblies, the annular seal includes a second notch on the first surface that is radially outward of the first notch.

In a further embodiment of any of the foregoing seal assemblies, includes at least one radial slot between the second notch and a radially outer surface of the annular seal.

In a further embodiment of any of the foregoing seal assemblies, includes a third notch on the second surface spaced axially aft of the first surface.

In a further embodiment of any of the foregoing seal assemblies, includes at least one axial slot between the third notch and an axially aft surface of the annular seal.

In a further embodiment of any of the foregoing seal assemblies, includes a biasing member biasing the annular seal into radial engagement with the rotating element.

In a further embodiment of any of the foregoing seal assemblies, the annular seal includes a first annular seal and a second annular seal disposed within the fixed housing and a biasing member biasing the first annular seal away from the second annular seal and into engagement with the fixed housing.

A turbine engine according to an exemplary embodiment of this disclosure, among other possible things includes a fixed housing including a radially inner fixed surface. A rotating element is mounted to a shaft configured for rotation about an axis. The radially inner fixed surface of the fixed housing is spaced apart from the rotating element. An annular seal is disposed within the fixed housing including a first surface configured for sealing against the fixed housing. A second surface is configured for sealing against the rotating element and a first notch on the first surface spaced radially apart from the second surface. The radially inner fixed surface of the fixed housing is aligned with the first notch.

In a further embodiment of any of the foregoing turbine engines, the first surface is disposed transverse to the axis and includes an upper radial surface radially outward of the first notch and a lower radial surface axially flush with the upper radial surface and radially inward of the first notch.

In a further embodiment of any of the foregoing turbine engines, the annular seal includes a first annular seal and a second annular seal disposed within the fixed housing and a biasing member biasing the first annular seal away from the second annular seal and into engagement with the fixed housing.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
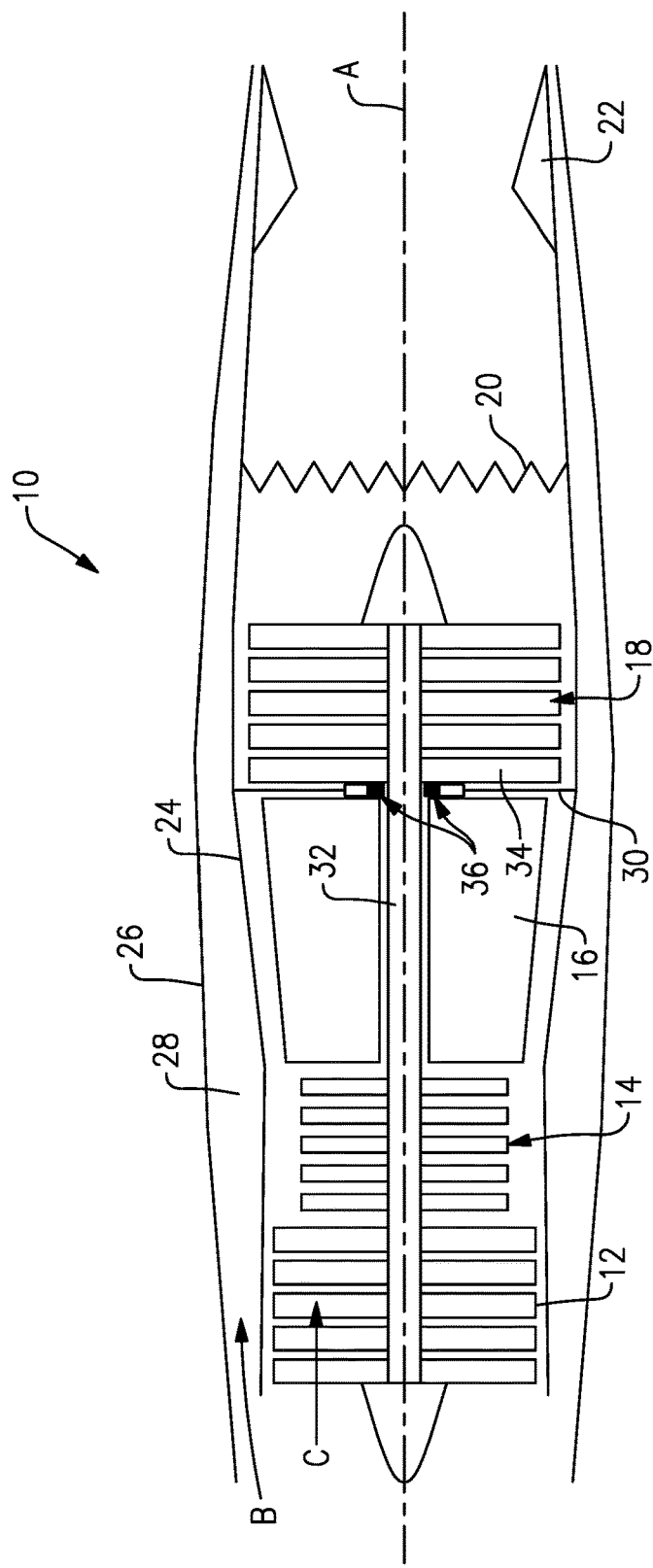
FIG. 1 is a schematic view of an example gas turbine engine.

Referring to FIG. 1, a gas turbine engine 10 includes a fan section 12, a compressor section 14, a combustor section 16, and a turbine section 18. Air entering into the fan section 12 is initially compressed and fed to the compressor section 14. In the compressor section 14, the incoming air from the fan section 12 is further compressed and communicated to the combustor section 16. In the combustor section 16, the compressed air is mixed with gas and ignited to generate a hot exhaust stream. The hot exhaust stream is expanded through the turbine section 18 to drive the fan section 12 and the compressor section 14. In this example, the gas turbine engine 10 includes an augmenter section 20 where additional fuel can be mixed with the exhaust gasses 28 and ignited to generate additional thrust. The exhaust gasses flow from the turbine section 18 and the augmenter section 20 through an exhaust liner assembly 22. The example turbine engine also includes a nozzle 22 to further accelerate exhaust gases and provide additional thrust.

The example turbine engine includes a core gas flow sea that flows through the fan section, compressor section and is exhausted through the turbine section. The gas turbine engine 10 also includes an inner liner 24 and an outer duct wall 26 that defines a bypass passage 28 for a bypass air flow B. The bypass air flow B is propelled through the bypass passage 28 to provide additional thrust generated by the example gas turbine engine 10.

A seal assembly 36 is provided adjacent the shaft 32 to seal about the rotating shaft 32. The example seal assembly 36 is supported by a static engine structure 30 and dispose adjacent the shaft 32 that supports a rotor 34.

Figure 2:
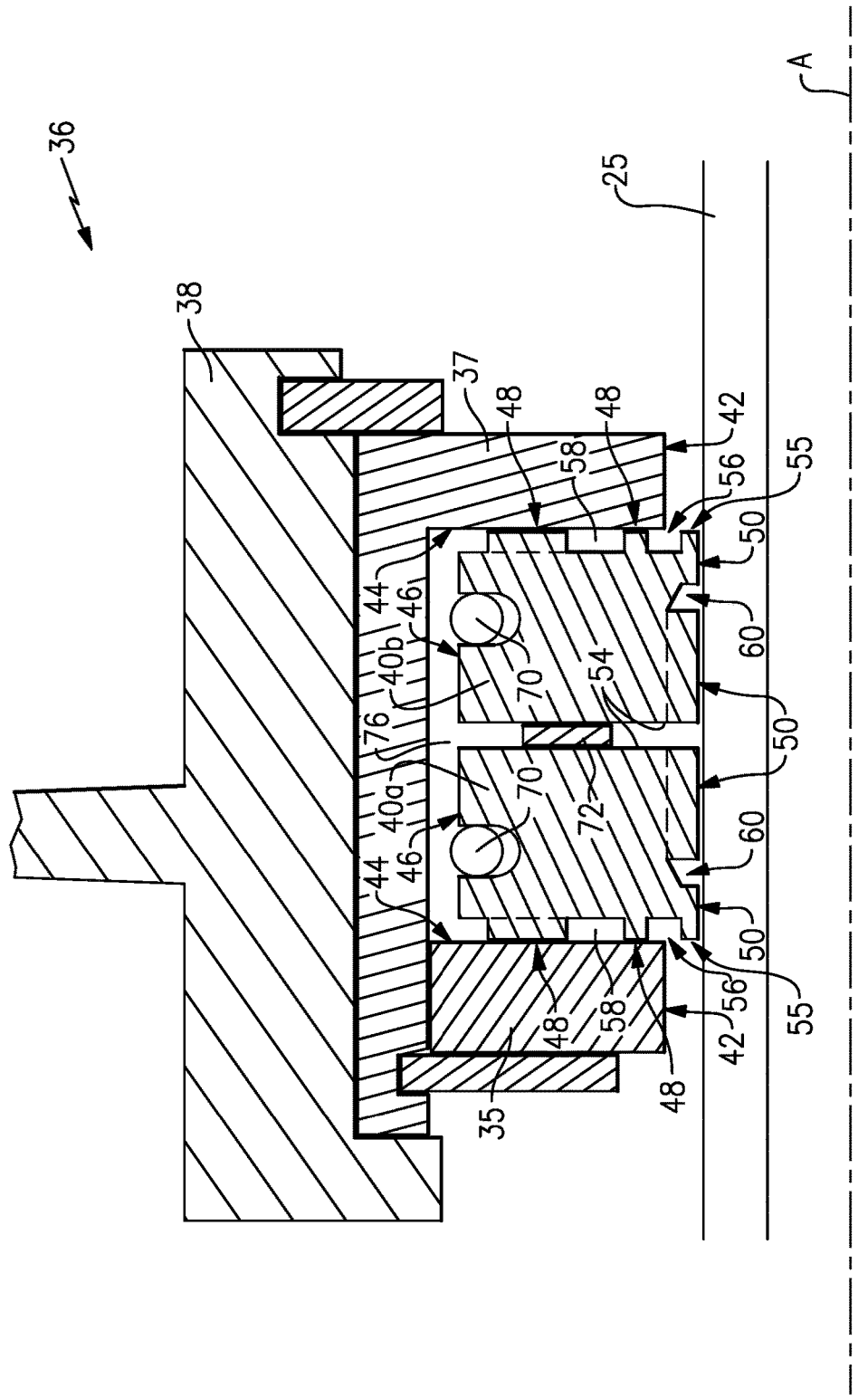
FIG. 2 is a sectional view of an example seal assembly.

Referring to FIG. 2 with continued reference to FIG. 1, the example seal assembly 36 includes a fixed housing 38 that is supported by the static engine structure 30. The housing 38 includes a forward section 35 and an aft section 37 within which annular seals 40A and 40B are disposed. The annular seals 40a, 40b are biased radially downward against a plate 25 that rotates with the shaft 32 and axially outward against a forward section 35 and aft section 37 of the fixed housing 38.

Each of the annular seals 40A, 40B includes an first or upper radial surface 48 that is in sealing contact with the radial sealing surfaces 44 defined by the forward and aft sections 35, 37 of the housing 38. The annular seals 40A, 40B include a second surface 50 defining an inner periphery that is in sealing contact with the plate 25 that is connected to the rotating shaft 32.

In this example, a first annular seal 40A and a second annular seal 40B are disposed within the housing 38 and are biased radially downward against the plate 25 by radial biasing members 70. The radial biasing members 70 are disposed on a radially outer surface 46 of the annular seals 40A, 40B. An axial biasing member 72 is disposed between the annular seals 40A, 40B and forces the annular seals 40A, 40B axially outward from each other against corresponding radial sealing surfaces 44.

The upper radial surface 48 of each of the annular seals 40A, 40B includes a first notch 56 and a second notch 58. The upper radial surface 48 also includes the second notch 58 radially outboard of the first notch 56.

Each of the annular seals 40A, 40B includes a third notch 60 disposed on the second surface 50. The second notch 60 is spaced axially aft of the first notch 56 and the outer radial surface 48. The third notch 60 is spaced axially aft of the first notch 56 and the outer radial surface 48.

Figure 3:
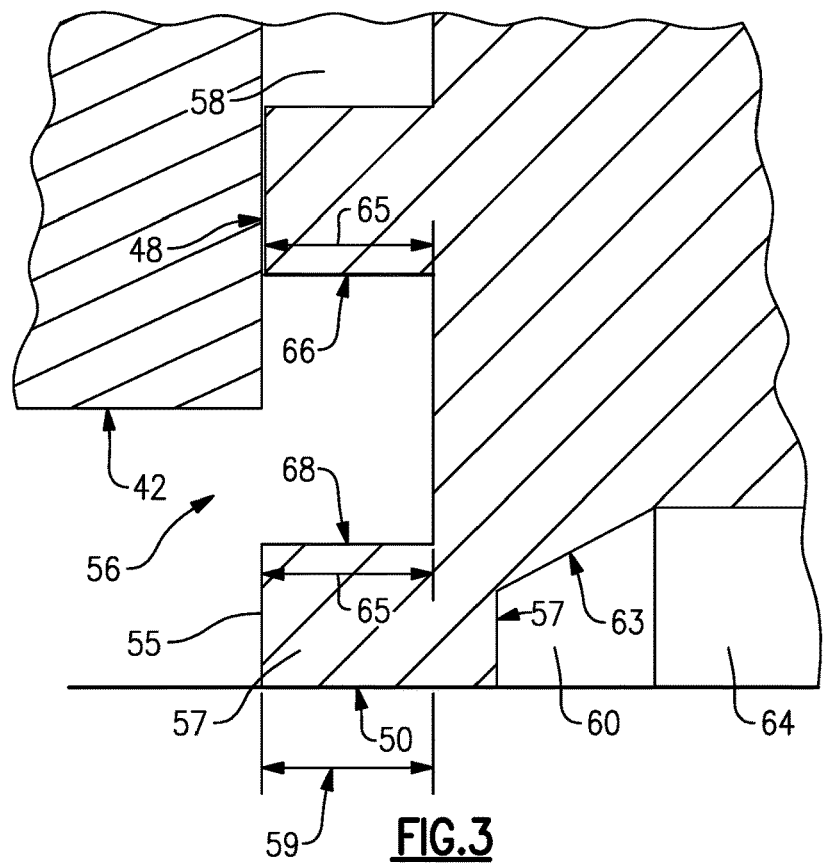
FIG. 3 is an enlarged view of a portion of an example annular seal.
Figure 4:
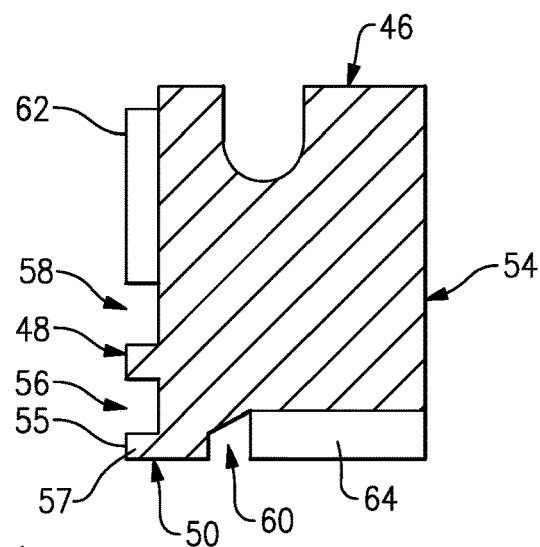
FIG. 4 is a cross-section of an example annular seal.

Referring to FIGS. 3 and 4 with continued reference to FIG. 2, each of the annular seals 40A, 40B includes the first notch 56 defined by an inner axial surface 68 and an outer axial surface 66. The first notch 56 is spaced a radial distance away from the second surface 50 such that it is not disposed against the rotating plate 25.

A foot 57 is defined radially inward of the first notch 56 and includes a lower radial surface 55 that is substantially flush with the upper radial surface 48 above the first notch 56. Because the lower radial surface 55 is axially even with the upper radial surface 48 above the first notch 56, a desired radial force balance is improved. The foot 57 includes an axial length 59 that is greater than the axial length 65 of the first notch 56. The first notch 56 radially overlaps a radially inner fixed surface 42 of the housing of the corresponding forward and aft sections 35, 37 of the fixed housing 38.

The third notch 60 is disposed axially aft of the outer radial surface 48 and is in communication by way of the second slot 64 with the back surface 54 of the corresponding annular seal. In this example the third notch 60 includes an angled upper radial surface 63 that angles radially outward toward the back surface 54. The angled surface extends to a radial height of the slot 64. Other geometries for the third notch 60 are also within the contemplation of this disclosure. Such geometries can include a rectangular shape, a tapered curved shape along with other possible shapes that provide a desired area.

The first notch 56 includes a radially outer axial surface 66 and radially inner axial surface 68. The radially inner and outer axial surfaces 66 and 68 are the same axial length 65. The first notch 56 is a relief cut near the radially inner fixed surface 42 of the housing 38 that prevents uneven wear along the outer radial surface 48. The outer axial surface 66 is always radially outboard of the radially inner fixed surface 42 and the inner axial surface 68 is always inboard of the radial inner fixed surface 42. Because the radial inner fixed surface 42 is always aligned within the relief provided by the first notch 56, the foot 57 does not contact the radial inner fixed surface 42 and the possibility of damage is significantly reduced. Moreover, because the radially outer axial surface 66 is always outboard of the radially inner fixed surface 42 the possibility of uneven wear or damage is significantly reduced. Accordingly, the foot 57 can be extended such that the lower radial surface 55 is axially flush with the upper radial surface 48 above the first notch 56 to provide the desired force balance without risking contact with the radial inner fixed surface 42.

The second notch 58 is spaced radially outward of the first notch 56. The third notch 60 is disposed on the second sealing surface is, in this example, axially spaced apart from the first sealing surface and the first notch 56. The first and second notches 56 and 58 are substantially rectangular but may also be provided with different geometries such as curved or contoured shapes.

The example plate 25 rotates relative to the seal assembly 36 and the fixed housing 38. High pressure air or gas 76 is present within the gap between radially outer surfaces of the annular seals 40A, 40B. The high pressure air 76 is communicated to the third notch 60 by way of the second slot 64. The same high pressure air is communicated to the second notch 58 through the second slot 62. Accordingly, high pressure air is communicated through the first and second slots 64, 62 to provide the biasing and equilibrium forces against the axial surface of the rotating plate 25 and the sealing surface 44.

The first notch 56 provides a relief cut to prevent the foot 57 of the annular seal 40 from contacting the radial inner fixed surface 42 due to uneven wear between the upper radial surface 48 and the lower radial surface 55. The notch 56 is configured such that radial movement of the annular seal 40 does not cause the inner radial surface 42 to overlap the foot 57 and the lower radial surface 55 defined by the foot 57. Regardless of the wear experienced on the upper radial surface 48 above the first notch 56, the foot 57 will not contact the radial inner fixed surface 42. Accordingly, the lower radial surface 55 of the foot 57 can extend flush with the upper radial surface 48 to provide the desired force balance while also improving operational life.

In this example, each of the annular seals 40A, 40B are formed from a carbon material to provide the desired sealing performance while maintaining and reducing the amount of friction engaged between relative moving components such as the rotating plate 25 and sealing surfaces 44 defined by the forward and aft sections 35, 37 of the housing 38.

Figure 5:
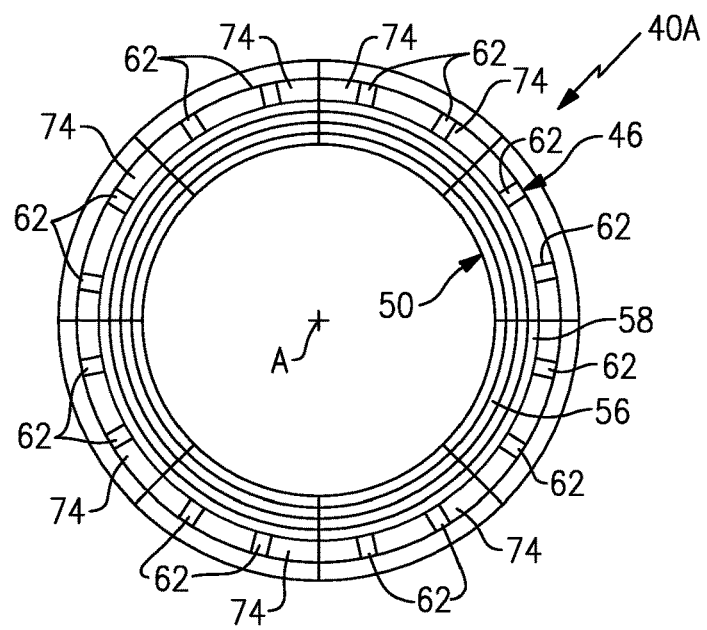
FIG. 5 is a front view of an example annular seal including a plurality of arcuate segments.
Figure 6:
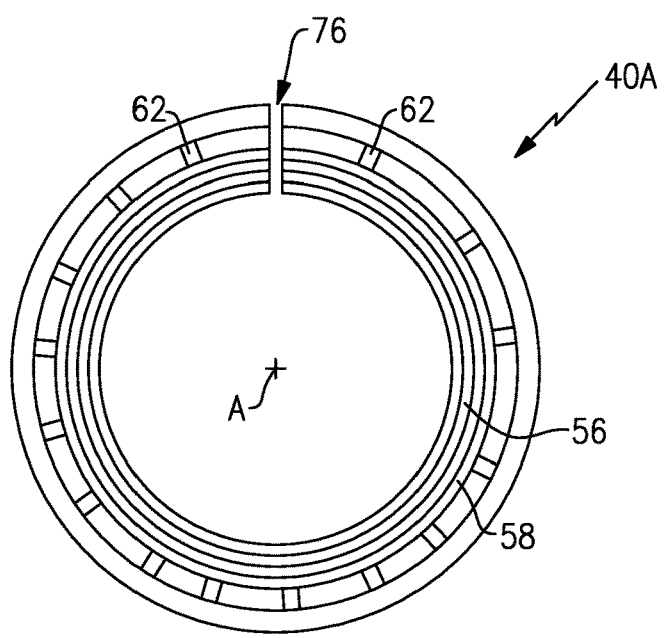
FIG. 6 is another front view of another example annular seal formed as a single unitary structure.

Referring to FIGS. 5 and 6, a forward radial surface of one of the annular seals 40A is shown and discloses that the first notch 56 is a continuous annular notch about the circumference of the annular seal 40A. The second notch 58 is spaced radially apart from the first notch 56 and is also a continuous annular notch disposed along the first surface that engages the radial sealing surface 44 defined by the fixed housing 38.

FIG. 5 illustrates the annular seal 40A as a plurality of arcuate segments 74. The example annular seals 40A, 40B may also be constructed for a single unitary annular element as is shown in FIG. 6. The single unitary element may have a radial expansion slot 76.

Accordingly, the example annular seal assembly includes a foot and axial surface below a first notch that is flush with an axial sealing surface above the first notch to provide a desired force balance. The first notch is configured such that radial movement of the seal does not result in the lower axial surface contacting the radial inner surface of the housing and also maintains the outer surface in contact with the radial inner surface of the housing to avoid uneven wear. Accordingly, the example seal provides the desired radial force balance while also improving axial surface wear life.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A seal assembly comprising;
a fixed housing including a radially extending sealing surface and an inner fixed surface, the inner fixed surface is an in innermost face of the fixed housing and beginning at the radially extending sealing surface extends axially directly from the radially extending sealing surface in a direction parallel with an axis of rotation; and
an annular seal disposed within the fixed housing, the annular seal including a first surface and a second surface, the first surface transverse to the axis of rotation and in sealing contact with the radially extending sealing surface of the fixed housings and the second surface is parallel to the axis of rotation, the first surface including a first notch spaced apart from the second surface, the first notch overlapping the inner fixed surface of the fixed housing at the radially extending sealing surface, wherein the first surface includes an upper radial surface radially outboard of the first notch and a lower radial surface that is radially inboard of the first notch, and wherein the upper radial surface is flush with the lower radial surface and a second notch on the first surface is radially outward from the first notch.

2. The seal assembly as recited in claim 1, wherein the first notch includes a radially inner axial surface spaced apart from a radially outer axial surface.

3. The seal assembly as recited in claim 1, wherein the first notch extends annularly about the annular seal.

4. The seal assembly as recited in claim 1, including at least one slot in communication with the second notch and a radially outer surface of the annular seal.

5. The seal assembly as recited in claim 1, wherein the annular seal includes an additional notch disposed on the second surface and spaced axially apart from the first surface.

6. The seal assembly as recited in claim 1, including a radial spring disposed on a radially outer surface of the annular seal for biasing the annular seal into contact with a rotating element.

7. The seal assembly as recited in claim 1, wherein the annular seal comprises a first annular seal and a second annular seal disposed within the fixed housing and a biasing member biasing the first annular seal away from the second annular seal and into engagement with the fixed housing.

8. A seal assembly for a turbine engine, comprising:
a fixed housing including first and second radially extending sealing surfaces spaced axially apart and corresponding first and second inner fixed surfaces extending directly axially from the corresponding one of the first and second radially extending sealing surfaces;

a rotating element configured for rotation about an axis, wherein the first and second inner fixed surfaces of the fixed housing are spaced apart from the rotating element; and first and second annular seals disposed within the fixed housing, each of the first and second annular seals including a first surface sealing against a corresponding one of the first and second radially extending sealing surfaces of the fixed housing, a second surface sealing against the rotating element, and a first notch on the first surface spaced radially apart from the second surface, wherein a corresponding one of the first and second inner fixed surface of the fixed housing is aligned with the first notch at a location extending directly axially from the corresponding one of the radially extending sealing surfaces.

9. The seal assembly as recited in claim 8, wherein the first notch includes a radially inner axial surface and a radially outer axial surface.

10. The seal assembly as recited in claim 8, wherein the first surface includes an upper radial surface radially outward of the first notch and a lower radial surface and radially inward of the first notch, and wherein the upper radial surface is flush with the lower radial surface.

11. The seal assembly as recited in claim 8, wherein each of the first and second annular seals include a second notch on the first surface that is radially outward of the first notch.

12. The seal assembly as recited in claim 11, including at least one radial slot between the second notch and a radially outer surface of each of the first and second annular seals.

13. The seal assembly as recited in claim 8, including an additional notch on the second surface spaced axially aft of the first surface.

14. The seal assembly as recited in claim 13, including at least one axial slot between the additional notch and an axially aft surface of the annular seal.

15. The seal assembly as recited in claim 8, including first and second biasing members biasing a corresponding one of the first and second annular seal into sealing engagement with the rotating element.

16. The seal assembly as recited in claim 8, including a biasing member biasing the first annular seal away from the second annular seal and into engagement with corresponding first and second radially extending sealing surfaces of the fixed housing.

17. A turbine engine comprising:
a fixed housing including a radially extending sealing surface and a radially inner fixed surface extending axially from the radially extending sealing surface;
a rotating element configured for rotation about an axis, wherein the radially inner fixed surface of the fixed housing is spaced apart from the rotating element; and
a first annular seal and a second annular seal disposed within the fixed housing, each of the first annular seal and the second annular seal including a first surface and a second surface, the first surface configured for sealing against the radially extending sealing surface of the fixed housing, the second surface configured for sealing against the rotating element, and a first notch on the first surface spaced radially apart from the second surface, wherein the radially inner fixed surface of the fixed housing is aligned with the first notch at the radially extending sealing surface, wherein a biasing member biasing the first annular seal away from the second annular seal and into engagement with the fixed housing.

18. The turbine engine as recited in claim 17, wherein the first surface includes an upper radial surface radially outward of the first notch and a lower radial surface radially inward of the first notch, and wherein the upper radial surface is flush with the lower radial surface.

* * * * *